United States Patent

[11] 3,630,813

| [72] | Inventor | John W. Allen |
| | | Flossmoor, Ill. |
| [21] | Appl. No. | 738,637 |
| [22] | Filed | June 20, 1968 |
| [45] | Patented | Dec. 28, 1971 |
| [73] | Assignee | Stanray Corporation |
| | | Chicago, Ill. |

[54] COMPOSITE PANEL STRUCTURE
4 Claims, 5 Drawing Figs.

[52] U.S. Cl. .................................................. 161/43,
161/68, 161/162, 161/220
[51] Int. Cl. .................................................. B32b 3/12,
B32b 5/16
[50] Field of Search .......................................... 161/68, 69,
162, 41, 44, 220, 43

[56] References Cited
UNITED STATES PATENTS

| 2,744,042 | 5/1956 | Pace | 161/161 X |
| 2,745,779 | 5/1956 | Ritter et al. | 161/44 X |
| 2,859,187 | 11/1958 | Ropella | 161/69 X |
| 3,364,097 | 1/1968 | Dunnington | 161/69 |
| 2,106,943 | 2/1938 | Fischer | 161/69 X |

*Primary Examiner*—John T. Goolkasian
*Assistant Examiner*—Henry F. Epstein
*Attorney*—Sabin C. Bronson ABSTRACT: A composite panel adapted for use as a load-bearing structural member, including a rigid cellular core having bonded in the cells thereof a compressed fibrous and resin mixture completely filling the cellular core so that the edges of the core are in plane with the filling material. An embodiment of the composite panel includes a high-wear resistance skin, such as fiber glass cloth, bonded to the outer faces of the filler material for assuming the wear.

The disclosure also relates to a method for forming the above-described composite panel in which the filler material is placed on the core and is then compressed therein between heated press plates and held therein under pressure until the resin is cured and the material bonded to the cellular core.

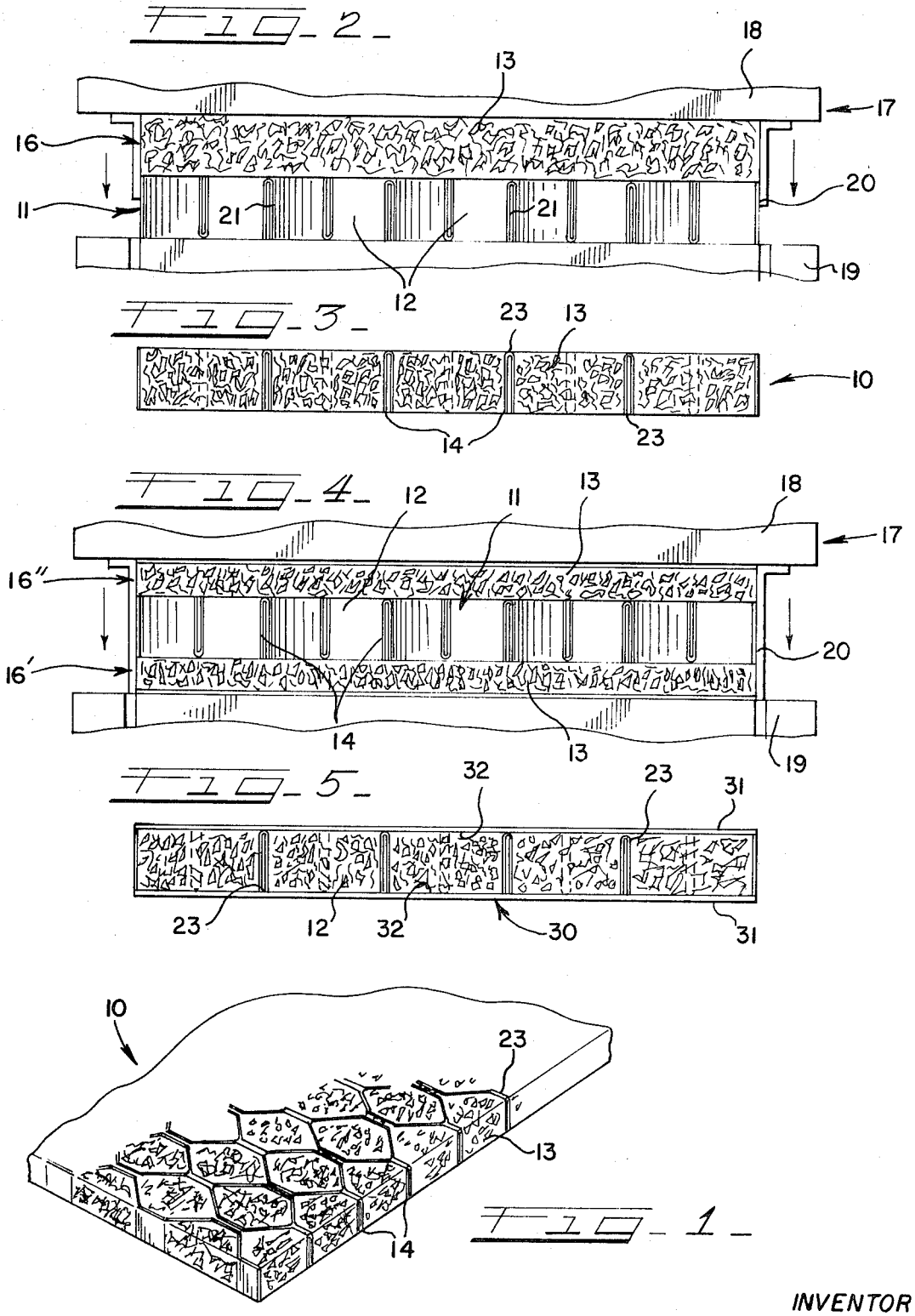

COMPOSITE PANEL STRUCTURE

BACKGROUND-SUMMARY-DRAWINGS

Heretofore it has been common practice to use laminated panels such as plywood and the like as load-bearing structures, as, for example, as a floor, wall and the like. Plywood, which is composed essentially of a plurality of laminated veneer sheets bonded by an adhesive, is characterized by the low wear resistance provided by wood. A further disadvantage lies in the relatively low shear loading which can be imposed, because the shear strength is limited by the characteristic of the laminated sheets of wood veneer and by the bond strength of the glue at the multiple interfaces of the laminate. Moreover, plywood is subject to dimension instability and extreme and undesirable warpage because of its tendency to absorb and release moisture under varying weather conditions.

While efforts have been made to overcome the dimensional instability and warpage by altering the grain arrangement of the veneer sheets and modifying the bonding agent, these problems have not been satisfactorily solved.

Another well-known type of panel is made from a compressed and hardened cellulose fiber-resin mixture. These panels are commonly known as flake or hard board. This type of panel is not as susceptible to moisture absorption as plywood so that it is substantially dimensionally stable and is not subject to the same degree of warpage. Flake board panels have been extensively used as interior decorative wall panels. However, use of flake board has been limited in load-bearing structural components such as floors and the like because of its inability to withstand the shear loading imposed on such structures. Moreover the surface characteristics of the flake board are such that it has low resistance to wear and is readily damaged. However, the primary advantage of flake board is in its ability to withstand high compression loading.

It is a principle object of the present invention to provide a new and novel composite panel which overcomes the difficulties encountered heretofore.

It is another object to provide a composite panel which is of lightweight construction while having high wear resistant faces and high strength, so that the panel is capable of being used as a structural load bearing member.

By the present invention there is provided a composite panel including a rigid cellular core made from metal or the like. The cavities or cells are filled with a cured fibrous-resin mixture compressed and bonded into each of the cells of the core whereby the filling material imparts a high impact resistance to the panel and stiffens and rigidifies the webs defining the cells to increase the shear strength of the panel.

The faces of the filler material are coplanar with the edges of the core webs so that the latter also assume wear caused by frictional engagement with other objects. Alternatively, the composite panel may have a high wear resistant skin bonded to the opposite faces thereof to impart wear resistance thereto.

It is a further object to provide a new and novel method for making the foregoing described composite panels.

In practicing the method of the present invention, a fibrous material such as wood flakes is mixed with a bonding agent and formed into a slab having planar dimensions substantially the same as the cellular core.

The slab is compressed into the core to simultaneously fill each of the cells with the fiber-bonding agent mixture. The core with the compressed mixture is further treated to cure or set the bonding agent whereby the latter becomes a solid homogeneous mass filling the core and the bonding agent forms a bond with the core.

Alternatively the slab as described above may be formed in two sections and the grid sandwiched therebetween. The two sections are then simultaneously pressed into the core and treated as described in the foregoing method so that the homogeneous material completely fills the cellular core and is bonded to the walls of the cells.

The present invention will be more fully and readily understood by reference to the accompanying drawings taken in conjunction with the following specification wherein like reference characteristics refer to like parts.

FIG. 1 is a fragmentary perspective view of a composite panel embodying the structure of the present invention;

FIG. 2 is a fragmentary front elevational view of an uncured slab disposed over a cellular core and positioned in a hot press apparatus for compressing the slab into the cells of the core to form the composite panel illustrated in FIG. 1;

FIG. 3 is a front elevational view of the composite panel formed by the apparatus of FIG. 2;

FIG. 4 is a front elevational view of a hot press apparatus in the open position showing a core sandwiched between a pair of slabs covered with wear resistant skins for forming another embodiment of the composite panel; and FIG. 5 is a front elevational view of the composite panel formed from the arrangement illustrated in FIG. 4.

The composite panel 10 of the present invention comprises generally a rigid cellular core member 11 having a plurality of cells or cavities 12 into each of which there is compressed the filler material 13. The panel 10 may be formed to any desired planar dimension and thickness depending on the ultimate use. The composite panel 10 of the present invention, for reasons which will become readily apparent hereafter, is particularly adapted for use as a structural load-bearing member subject to severe wear and shear stresses. For example, the composite panel 10 may be used as flooring and, under some conditions, as a load-bearing wall member.

The cellular core 11 may be made from any suitable rigid material as for example steel, aluminum, and, under some conditions, plastic. As shown, the cells 12 are hexagonal with each being defined by webs 14. The webs 14 each form a common side of an adjacent cell 12. As is well known, the thickness or cross-sectional area in this type of cellular grid structure may be relatively small without adversely affecting the load-carrying capacity thereof. By maintaining the thickness of the metal at a minimum, it is of course apparent that the weight and the cost of the panel may be correspondingly reduced.

To further permit the use of small cross-sectional area webs, the filler material is formed in a manner to impart a high impact strength to the panel 10 and also to rigidify the webs 14 so as to resist bending and twisting, whereby the shear resistance of the panel 10 is increased.

The compressed filler material 13 is made from a cellulose fiber or fibers or wood flakes capable of being molded into a block of such material having impact-absorbing characteristics. The fibers are mixed with a suitable bonding agent which serves to bond with the fibrous material, and also bonds the filler aggregate 13 to the webs 14. The binder may be either a natural or synthetic resin. For example, a thermoplastic resin such as phenol formaldehyde may be used to render the filler material 13 water resistant.

The binder and fibers are initially wet mixed in a tumbler and molded into a low density slab 16 as shown in FIG. 2. In this condition the binder is not set and the slab 16 is said to be uncured and at this stage is quite unstable. Thereafter, as more fully to be explained hereinafter, the slab is further compressed and treated so that the binder sets whereby the slab 16 retains its compressed shape. This condition of the fiber-binder mixture is designated herein as cured.

In the preferred embodiment of the invention cellulose fiber material such as wood flakes, chips, sawdust or the like are used. The binding agent is a thermosetting resin. The resin is wet mixed with the cellulose fibrous material as by tumbling. The mixture is then molded into the uncured slab 16 having substantially the same planar dimensions as the core 11, but having a thickness greater than the height of the core webs 14.

The uncured slab 16 and the core are then positioned in a hot press mold apparatus 17 including a pressure applying head 18 and a bed 19. The apparatus is suitably heated by circulating therethrough hot oil or steam to a temperature of about 300° F. As shown, the slab 16 is disposed over the core 11 so that upon downward movement of the press head 18 the slab 16 is forced into the cells 12 between the webs 14. The hot press 17 may include side plates 20–20 sized to fit about the perimeter of the slab 16 and the core 11 to retain the former within the confines of the latter during compression. Thus the mixture of cellulosic fibers and resin is compressed into the core 11 to simultaneously fill each of the cells 12.

The press head 18 is retained in a closed position to maintain a pressure to compact and compress the cellulose-resin mixture within the cells 12. At the same time heat from the press 17 renders the resin molten so that the cellulosic fibers are saturated and bonded together to form a homogeneous mass bonded to the webs of the core 11. As shown the webs 14 may be provided with bonding openings 21 providing communication between the adjacent cells 12 so that the molten resin may flow therethrough during compression. In this manner a bond is formed between the filler material and each of the cells 12 to further assure the retention of the filler material within the core. Upon further heating between the jaws of the press the resin sets and is cured and the mixture hardens to form an integral mass with the cellular core member 11.

Referring now to FIG. 5 there is shown a further embodiment of a composite panel 30 having outer skins 31 made from a high wear corrosion resistant material. The composite panel 30 is similar to the composite panel of FIGS. 1 and 3 and includes a cellular core 11 of which each of the cells 12 is filled with a compressed filler material 13 made from a cured cellulose fiber and resin mixture. Bonded to the upper and lower faces 32 of the filler material 13 is the skin 31 which may be a fiber glass cloth extending over the entire outer surface of the composite panel 30. The fiber glass cloth 31 is preferably bonded to the panel 30 by the resin of the cellulose-resin mixture used to form the filler material 13.

The composite panel 30 may be formed in the manner illustrated in FIG. 4. A pair of uncured cellulose fiber resin bearing slabs 16' and 16" is formed as described in connection with the embodiment of FIGS. 1–3. The fiber glass cloth 31 is superposed on a surface of each of the slabs 16' and 16". The slabs 16' and 16" are formed so that the sum of the thicknesses thereof is greater than the height of the core webs 14.

The uncured slabs 16' and 16" and the core member 11 sandwiched therebetween are positioned in the hot press apparatus 17. The slabs 16' and 16" are then simultaneously compressed and compacted into the core 11 to fill each of the cells 12. The molten resin bonds the cellulose fibers together in a homogeneous mass filling the core member 11. Simultaneously the resin bonds the fiber glass cloth 31 to the composite panel 30. As the heating continues the resin is cured and the panel becomes an integrated solid structure. In this manner the fiber glass cloth is in intimate bonding contact with the composite panel and overlies the outer core edges 23, so that should the core be made from a corrosive metal, the cloth 31 protects the edges from the elements. Moreover, the rugged nature of fiber glass cloth 31 also provides a tough wear resistant surface.

Although the embodiments constructed in accordance with the present invention have been described with the requisite particularity, the disclosure is of course exemplary. Changes in details of construction, in size, configuration and arrangement of components and materials, and in modes of application will be apparent to those versed in the art and may be resorted to without departing from the scope of the invention as set forth in the following claims.

I claim:

1. A load-bearing composite panel comprising a rigid metal core member having a plurality of open ended cells defined by common webs, an impact-absorbing filler material comprising a compressed and cured mixture of cellulosic fiber material and a thermosetting resin binder in each of said cells and bonded to the walls of said cells, said upper and lower faces of said compressed and cured mixture being substantially coplanar with the upper and lower edges of said core member.

2. The invention as defined in claim 1 wherein said cellulosic fiber material comprises wood fibers.

3. The invention as defined in claim 1 wherein at least one of the faces includes a fiber glass wear-resistant skin bonded thereon by said cured thermosetting resin.

4. The invention as defined in claim 1 wherein a wear-resistant skin is bonded to said upper and lower faces of said filler material and overlying the opposite edges of said core member.

* * * * *